(12) United States Patent
Yi-Tsung

(10) Patent No.: US 6,511,329 B2
(45) Date of Patent: Jan. 28, 2003

(54) WATERPROOF CONNECTOR APPARATUS

(75) Inventor: Lin Yi-Tsung, Shulin (TW)

(73) Assignee: L & K Precision Industry CO., Ltd., Taipei Hsien (TW)

( * ) Notice: Subject to any disclaimer, the term of this patent is extended or adjusted under 35 U.S.C. 154(b) by 0 days.

(21) Appl. No.: 09/835,721

(22) Filed: Apr. 10, 2001

(65) Prior Publication Data

US 2002/0146937 A1 Oct. 10, 2002

(51) Int. Cl.⁷ .............................................. H01R 12/00
(52) U.S. Cl. ........................ 439/76.1; 439/862; 439/701
(58) Field of Search ............................ 439/76.1, 936, 439/946, 646, 660, 664, 665, 676, 344, 884, 889, 587, 630

(56) References Cited

U.S. PATENT DOCUMENTS

| | | | | |
|---|---|---|---|---|
| 5,538,435 A | * | 7/1996 | Yohn ........................... | 439/188 |
| 5,584,713 A | * | 12/1996 | Kato et al. ................... | 439/188 |
| 5,812,660 A | * | 9/1998 | Suzuki et al. ................ | 439/438 |
| 5,836,780 A | * | 11/1998 | Mizumura et al. ........... | 439/326 |
| 6,053,763 A | * | 4/2000 | Brennan et al. ............. | 439/491 |
| 6,086,424 A | * | 7/2000 | Chang ......................... | 439/630 |
| 6,093,057 A | * | 7/2000 | Lok ............................. | 439/607 |
| 6,186,833 B1 | * | 2/2001 | Wu .............................. | 439/668 |
| 6,203,335 B1 | * | 3/2001 | Chang ......................... | 439/79 |

* cited by examiner

Primary Examiner—Brian Sircus
Assistant Examiner—Son V. Nguyen
(74) Attorney, Agent, or Firm—Troxell Law Office PLLC

(57) ABSTRACT

A connector assembled in a mobile phone for transmitting signals and battery charging comprises a dielectric housing, a plurality of conductive terminals, and a plurality of charge terminals. The mean feature of the present invention is: a pair of alignment holes is defined in the dielectric housing at a mating direction for being assembled to housings of the mobile phone. The terminals of the connector elastically contact with a circuit board of the mobile phone. Each terminal includes a first contacting portion for contacting with a mating connector and a second contacting portion. The second contacting portion has an elastic end for contacting with a corresponding pad on the circuit board for transmitting signals. A waterproof layer is fill in a side of the dielectric housing where the terminals are assembled. A waterproof gasket is assembled to surround mating portion of the dielectric housing. Therefore, the connector assembled in the mobile phone and the terminals thereof are reliably waterproofed.

7 Claims, 8 Drawing Sheets

WATERPROOF CONNECTOR APPARATUS

BACKGROUND OF THE INVENTION

1. Field of the Invention

The present invention relates generally to an electrical connector, and more particularly to a waterproof electrical connector apparatus for use in appliances such as mobile cellular phones and the like, having a simple and reliable structure.

2. Description of the Art

A top housing and a bottom housing of a mobile phone usually should be properly waterproofed. A connector of the mobile used for transmitting signals and charging also should be properly waterproofed. Referring to FIG. 1, a conventional waterproof connector 5 used in a mobile phone comprises a housing 50, a plurality of conductive terminals 51, a plurality of charge terminals 520, a plurality of audio terminal 521, a waterproof gasket 53, a adaptor board 54, an elastic circuit board 55, a adaptor connector 56, and so on. The conductive terminals 51, the charge terminals 520 and the audio terminals 521 are inserted into the housing 50. The one end of each of the terminals 51, 520, 521 is received within the housing 50 for electrically contacting a mating connector (not shown), and the other end thereof extends outside the housing 50 for connecting with the adaptor board 54. The one end of the elastic circuit board 55 is electrically secured in the adaptor board 56 and is soldered to the conductive terminals 51, the charge terminals 520, the audio terminals 521 by a spot welded technique. The other end of the elastic circuit board 55 includes contacting tabs 551 for being inserted into the adaptor connector 56 assembled on a circuit board 6. Furthermore, a waterproof glue is filled with the adaptor board 54, the conductive terminals 51, the charge terminals 520 and audio terminals 521 for a waterproof purpose. A waterproof gasket 53 is assembled around an outside surface of the housing 50. Therefore, the connector 5 and the circuit board 6 is waterproofed. However, such a conventional connector 5 has following disadvantages:

(1) A complicated structure and high manufacture cost

The conductive terminals and the charge terminals of the conventional connector are connected to the elastic circuit board. The contacting tabs of the elastic circuit board electrically contact the circuit board. Those terminals therefore electrically contact the circuit board Such a structure requires a large number of components such as the adaptor board, the elastic circuit board and the adaptor connector. Obviously, such a structure is very complicated and cost inefficient. Besides the aforementioned components, the waterproof gasket is integrally formed on the housing so that an additional molding process for molding the waterproof gasket is needed.

(2) A unreliable electrical connection

The contact tabs of one end of the elastic circuit board are inserted into the adaptor connector so that the conventional connector is electrically connected to the circuit board. Because of the limited room between the top housing and bottom housing, the elastic circuit board is compressed and is inserted into the adaptor connector. Therefore, the elastic circuit board could be removed from the adaptor connector due to the improper operation by a user, especially, when the limited room between the top housing and the bottom housing is changed. So it is obvious that such a structure can not provide reliable electrical connection therebetween.

SUMMARY OF THE INVENTION

A first object of the present invention is to provide a waterproof connector used in a mobile phone, having a simple structure, and facilitating the manufacture.

Another object of the present invention is to provide a connector providing reliable electrical connection.

A main aspect of the present invention is to provide a connector comprising a plurality of terminals for electrically connecting a circuit board of a mobile phone, each terminal including a first contacting portion for electrically connecting to a mating connector, and a second contacting portion for electrically connecting to a circuit board. Each second contacting portion has a curved and elastic end for, in assembly, electrically contacting with corresponding pots on the circuit board.

Another aspect of the present invention is to provide a connector comprising a dielectric housing, the dielectric housing including a mating portion having a waterproof gasket for, in assembly, waterproofing secured holes of a mobile phone. Furthermore, a waterproof layer is filled with a side of dielectric housing of the connector and adjacent to the terminals thereby waterproofing the connector and the terminals.

A third aspect of the present invention is to provide a connector comprising a dielectric housing, the dielectric housing defining a groove for receiving a waterproof gasket. A waterproof layer assembled to the dielectric housing is further waterproofed by a block thereby reliably waterproofing the connector and terminals.

DETAILED DESCRIPTION OF THE INVENTION

Figure 1:
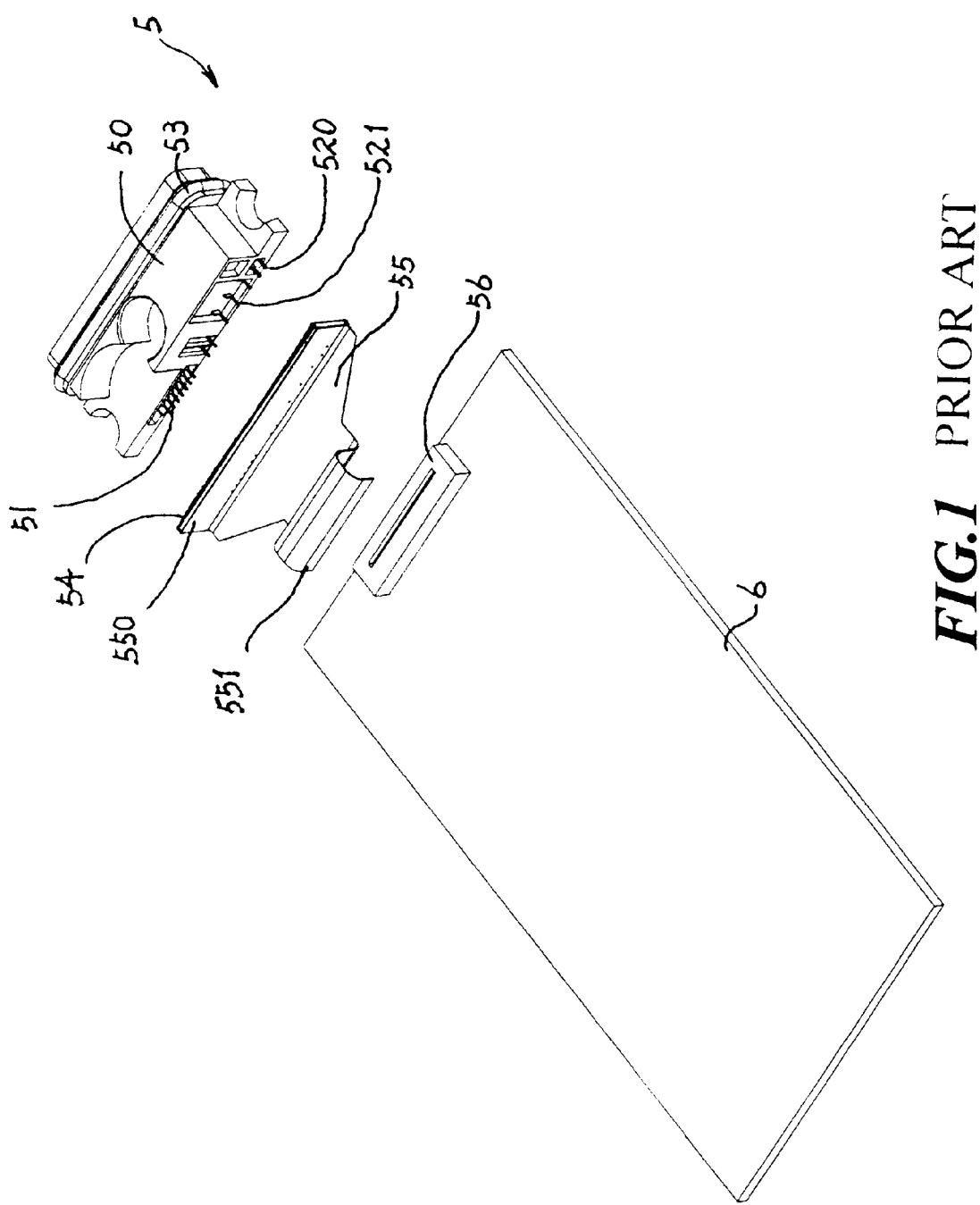
FIG. 1 is an exploded perspective view of a conventional connector and a circuit board of a mobile phone.
Figure 2:
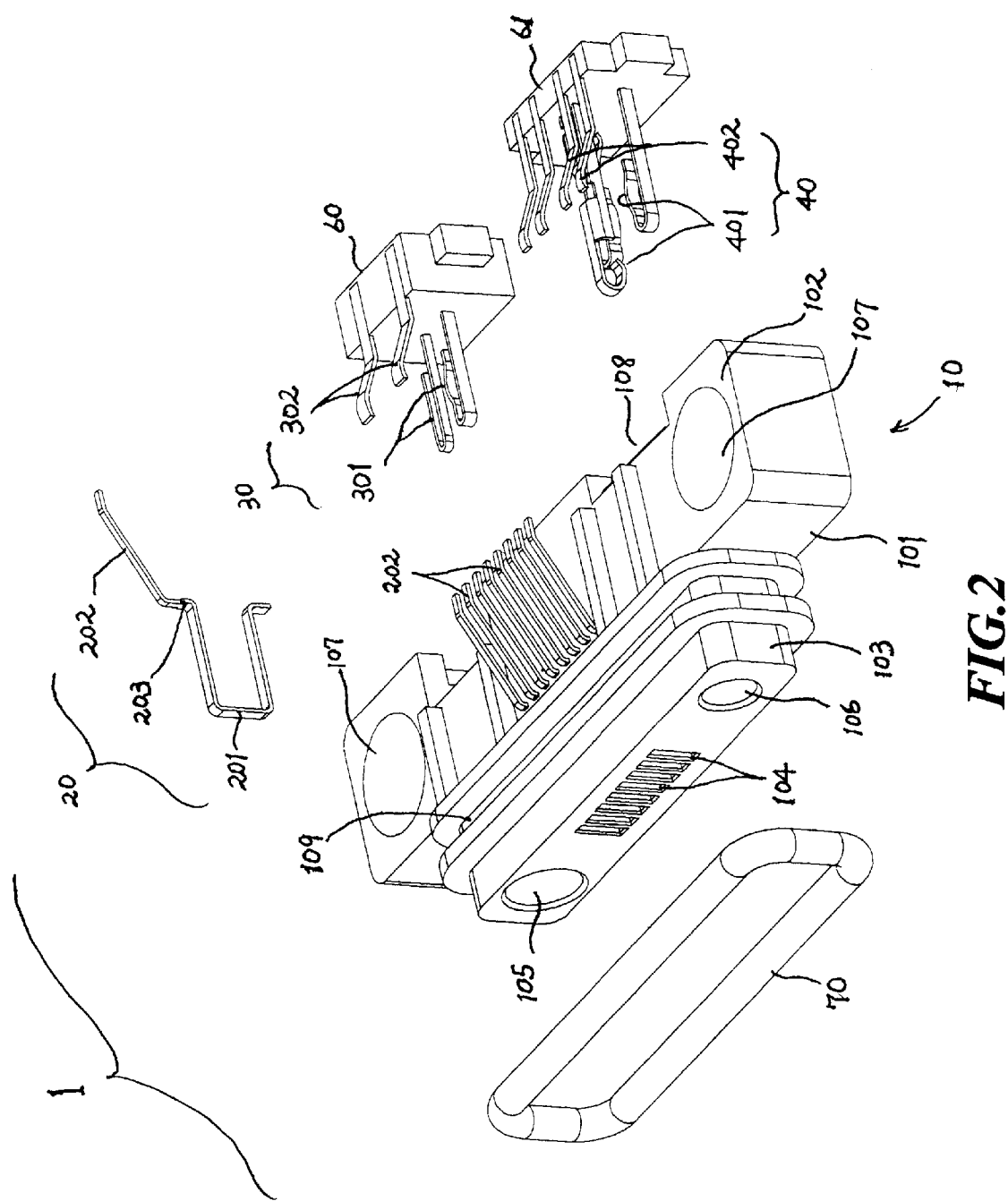
FIG. 2 is an exploded view of a connector of the present invention.
Figure 3:
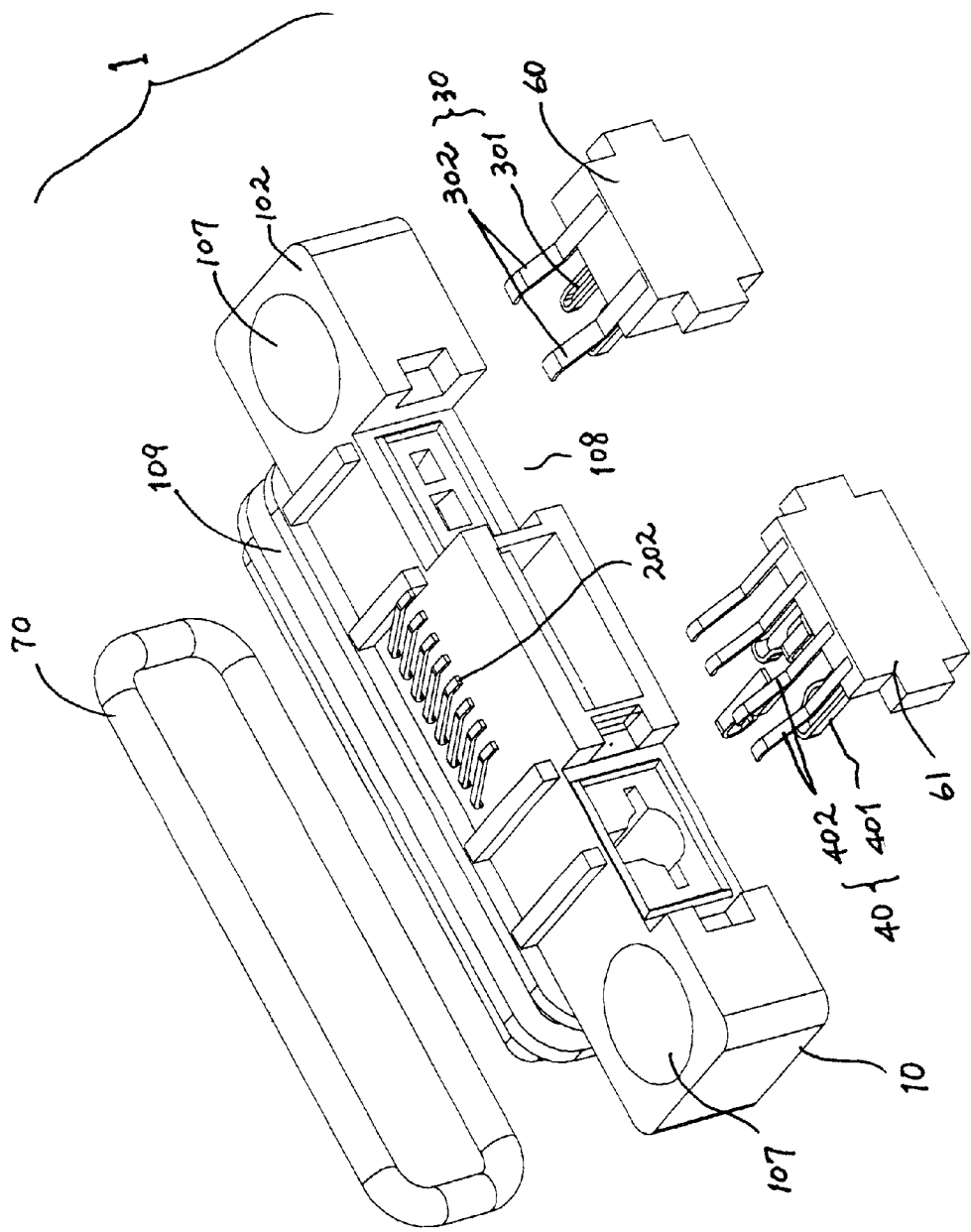
FIG. 3 is similar to FIG. 3, but viewed from a different perspective.

Referring to FIG. 2 and FIG. 3, a connector 1' of the present invention includes a dielectric housing 10, a plurality of conductive terminals 20, a plurality of charge terminals 30 and a plurality of audio terminals 40, etc. The dielectric housing 10 includes a mating surface 101 and a joint surface 102. A mating portion 103 extends forward from the mating surface 101. A plurality of passageways 104 is defined in the mating portion 103 for receiving the conductive terminals 20. A charge terminal receiving hole 105 and an audio terminal receiving hole 106 are defined adjacent to lateral ends of the mating portion 103 for receiving the charge terminals 30 and the audio terminals 40, respectively. A pair of alignment holes 107 is defined adjacent to lateral ends of mating surface 101 for being aligned with housings of a mobile phone which will be described in detailed later. A groove 109 is defined around the mating portion 103 for receiving a waterproof gasket 70.

The conductive terminals 20 are inserted into the passageways 104. Each conductive terminal 20 includes a first contacting portion 201, a second contacting portion 202 and an interference portion 203. The first contacting portions 201 are formed integrally receiving in the passageways 104 adjacent to the mating surface 101 and are parallel to the mating surface 101 for contacting terminals of a mating connector (not shown). The second contacting portion 202 has an elastic and a "U" shaped end and upwardly extends proximate to the mating surface 101 for electrically contacting a circuit board of a mobile phone.

Each of the charge terminal 30 is inserted into a charge assembly block 60 and includes a first charging portion 301 for electrically contacting a terminal of a mating connector, and a second charging portion 302 for electrically contacting a circuit board of a mobile phone. Each of the audio terminals 40 is inserted into an audio assembly block 61 and includes a first audio portion 401 for electrically contacting a terminal of a mating connector and a second audio portion 402 for electrically contacting a circuit board of a mobile phone. In assembly, the charge assembly block 60 and the audio assembly block 61 are melt by a ultrasonic process or a heating process so as to be securely attached to an indentation 108 of the dielectric housing 10 so that the charge terminal receiving hole 105 and audio terminal receiving hole 106 which are along a side of each of the charge assembly block 60 the audio assembly block 60, 61 are properly waterproof.

Figure 4:
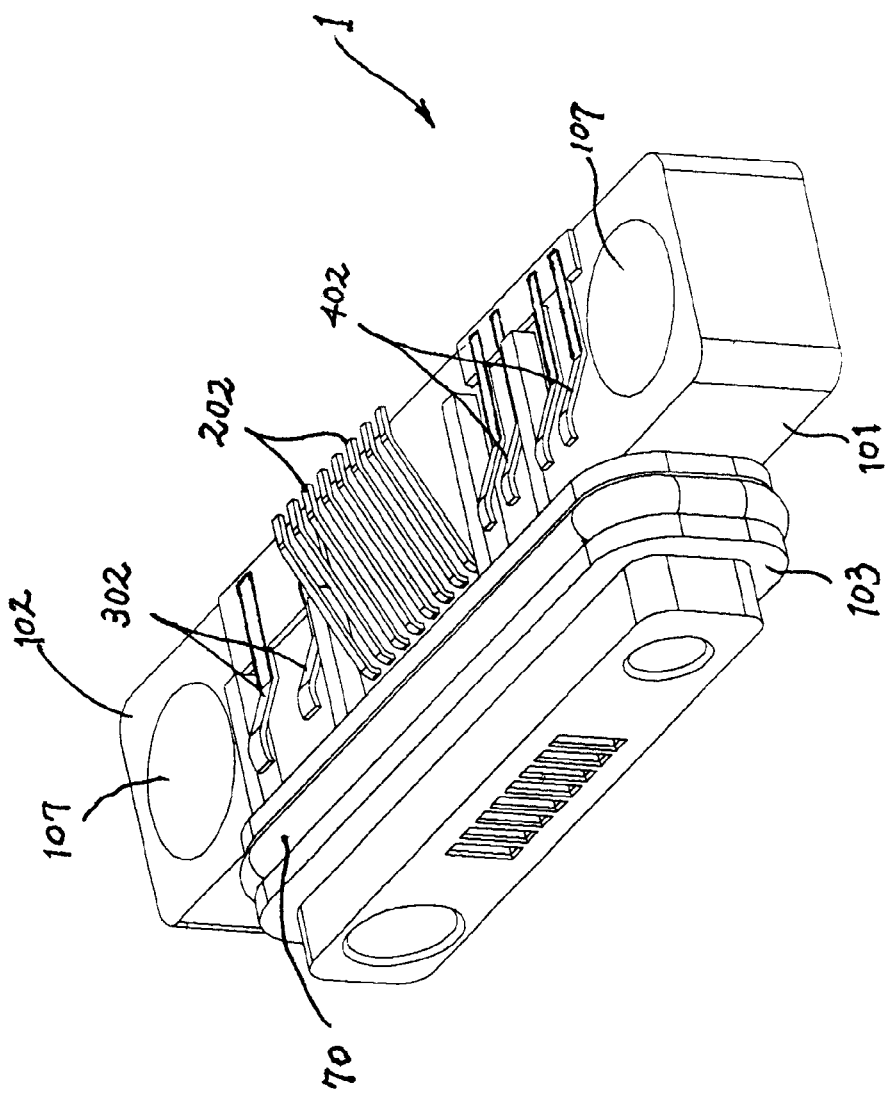
FIG. 4 is an assembled view of FIG. 2.
Figure 5:
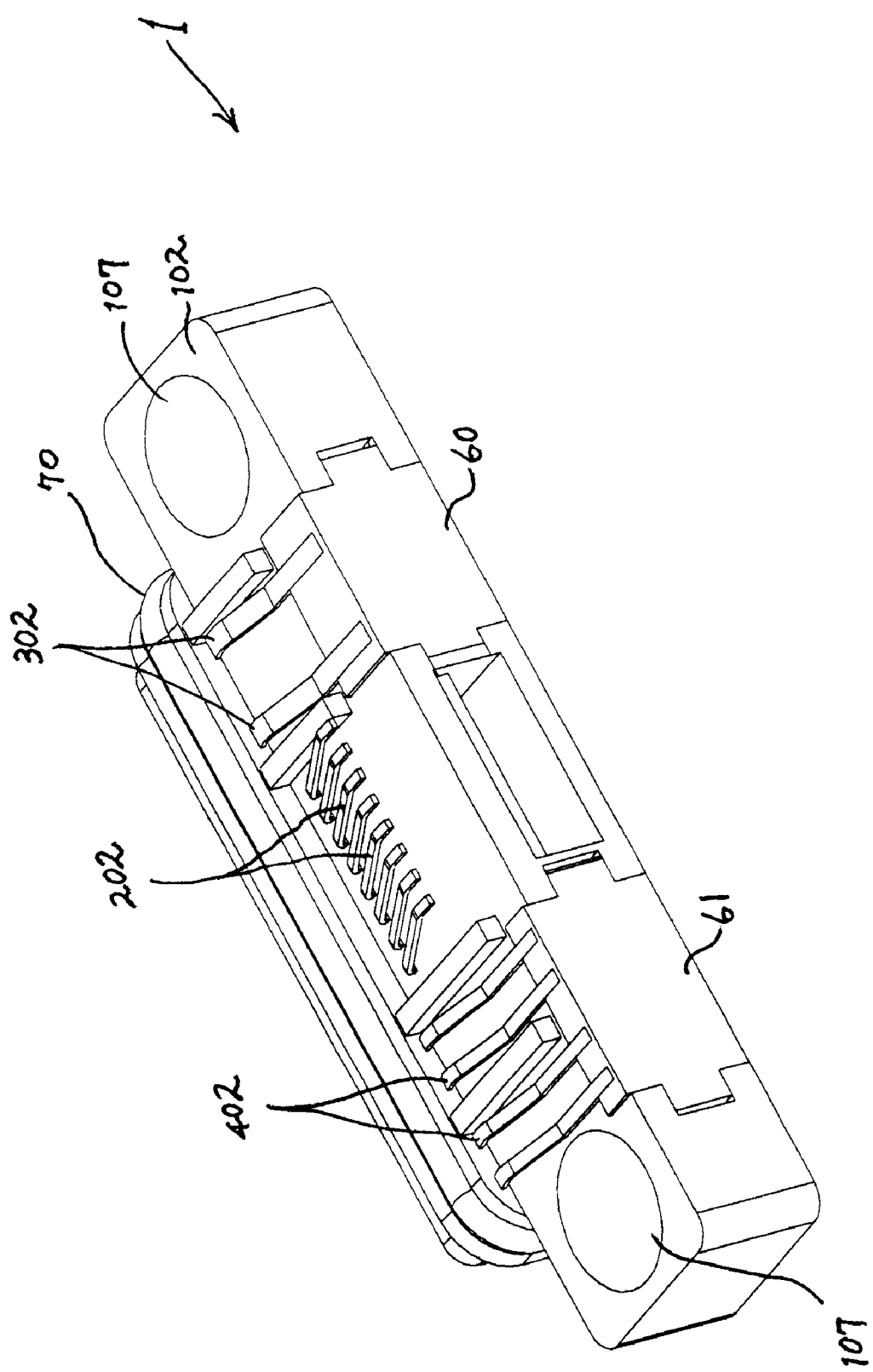
FIG. 5 is an assembled view of FIG. 3.
Figure 6:
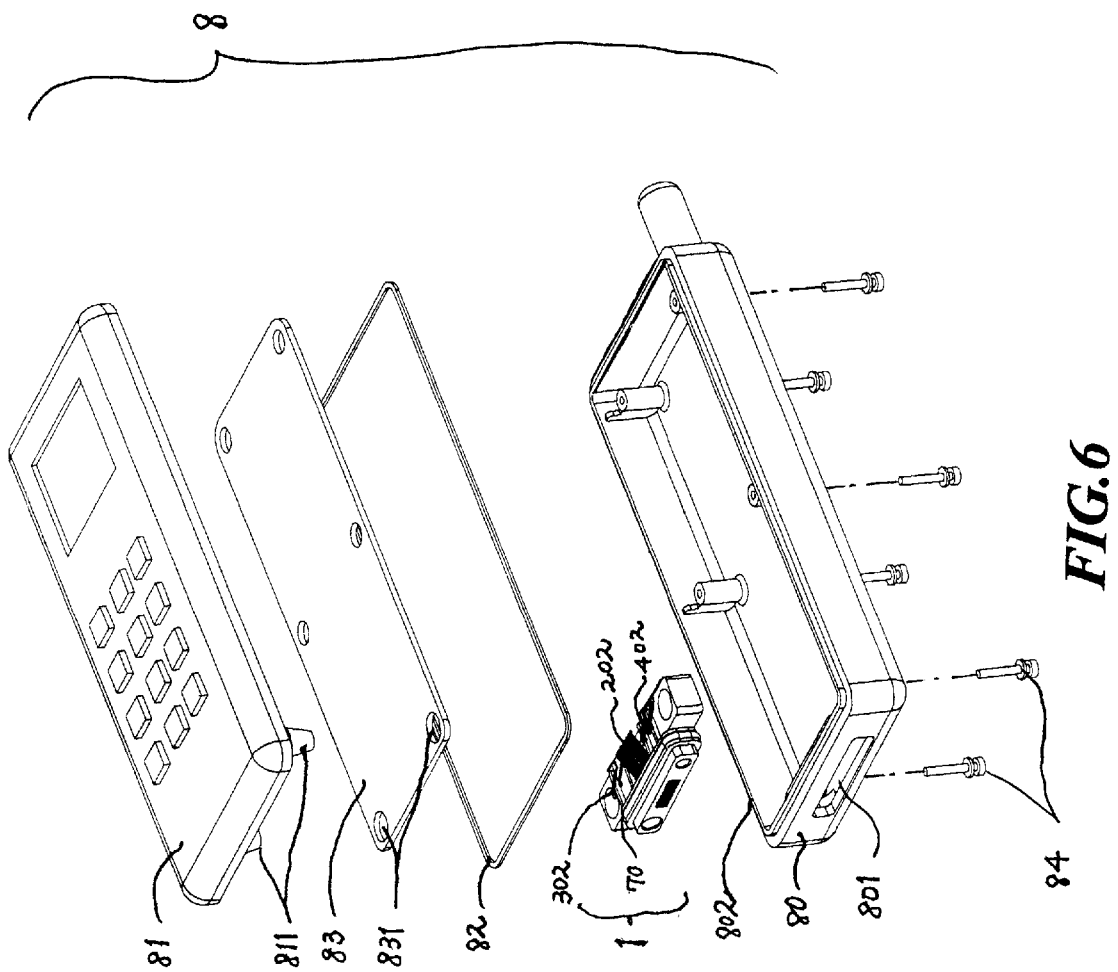
FIG. 6 is an exploded perspective view of a mobile phone with a connector of the present invention.

Referring to FIG. 4 and FIG. 5, the second contacting portion 202 of the conductive terminals 20 extend in a direction opposite to a direction in which the second charging portions 302 of the charge terminals 30 and the second audio portion 402 of the audio terminals 40 extend. Referring to FIG. 6, when the connector 1 of the present invention is assembled to a mobile phone 8, the connector 1 extends through an assembly window 801 of a bottom housing 80 of the mobile phone 8. A waterproof gasket 70 is attached around the mating portion 103 for waterproofing the assembly window 801 and an inner port of the bottom housing 80. A waterproof ring 82 is attached to a fringe 802 of the bottom housing 80. An alignment pole 811 of the top housing 81 extends through a corresponding orientation hole 831 of the circuit board 83. An alignment pole 811 is mated to an alignment hole 107, of the connector 1. A pair of waterproof bolts 84 extends through the bottom housing 80 to securely assemble the connector 1 to the bottom housing 80.

Figure 7:
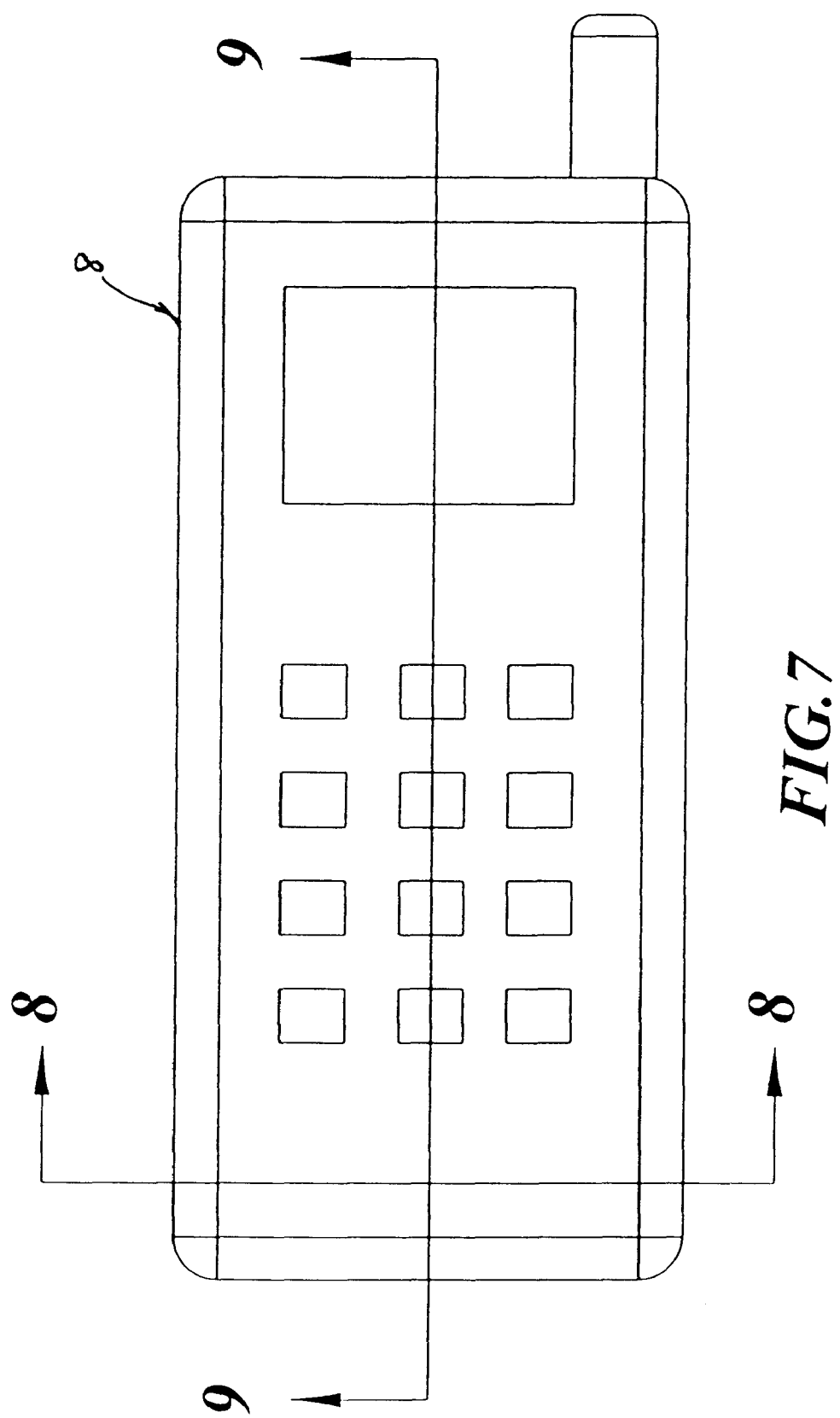
FIG. 7 is a top view and an assembled view of FIG. 6.
Figure 8:
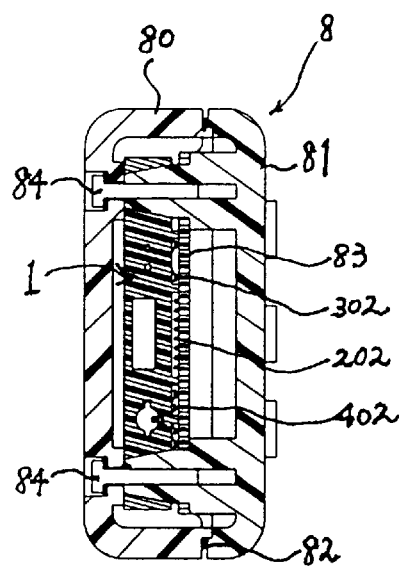
FIG. 8 is a cross-sectional view of the mobile phone along line 8—8 of FIG. 7.
Figure 9:
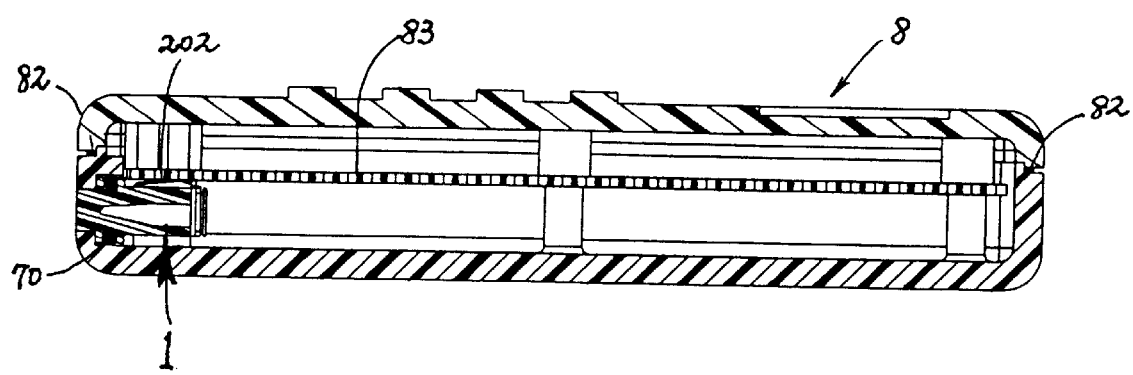
FIG. 9 is a cross-sectional view of the mobile phone along line 9—9 of FIG. 7.

Also referring to FIG. 7 to FIG. 9, when the connector 1 of the present invention is assembled to the mobile phone 8, the second contacting portions 202 of the conductive terminals 20, the second contacting portions 302 of the charge terminals 30, and the second audio portions 402 of the audio terminals 40 reliably contact the circuit board 83. The waterproof ring 82 is assembled between the top housing 81 and the bottom housing 80. A waterproof gasket 70 is assembled between the connector 1 and the assembly windows 801 of the bottom housing 80. The conductive terminals 20, the charge terminals 3 and the audio terminals 4 are waterproofed in a way which is discussed above so that the mobile phone 8 is reliably waterproofed. When the connector 1 of the present invention is assembled to the mobile phone, the connector 1 can reliably contacts the circuit board 83 and can be reliably waterproofed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A connector assembled in a mobile phone for transmitting signals, the connector comprising: a dielectric housing including a mating surface, a joint surface perpendicular to the mating surface and at least an alignment hole defined in the joint surface, a mating portion extending from the mating surface, a plurality of passageways being defined in the mating portion;

a waterproof gasket assembled to the mating portion of the dielectric housing;

a plurality of conductive terminals received in the passageways of the mating portion of the dielectric housing, each conductive terminal including a first contacting portion at an end thereof, a second contacting portion at an opposite end thereof, and an interference portion between the first contacting portion and the second contacting portion, the first contacting portion being positioned adjacent to the mating surface of the dielectric housing and being parallel to the mating surface, the second contacting portion extending from the interference portion, adjacent to the first contacting portion, and upwardly extending above the mating surface; and a plurality of charge terminals and a plurality of audio terminals respectively received in the dielectric housing, each charge terminal having a first charging portion, a charge interference portion extending from the first charging portion, and a second charging portion extending from the charge interference portion, and each audio terminal having a first audio portion, an audio interference portion extending from the first audio portion, and a second audio portion extending from the audio interference portion, the charge interference portions of the charge terminals being inserted into a charge assembly block, and the audio interference portions of the audio terminals being inserted into an audio assembly block;

wherein a charge terminal receiving hole and an audio terminal receiving hole respectively are defined in the mating surface of the dielectric housing, and a charge indentation is defined adjacent to the charge terminal receiving hole, and an audio indentation is defined adjacent to the audio terminal receiving hole, in assembly, the charge and the audio assembly blocks being respectively attached to the indentations of the dielectric housing.

2. The connector as claimed in claim 1, wherein the charge terminal receiving hole and the audio terminal receiving hole are defined adjacent to the passageways for respectively receiving the charge terminals and the audio terminals.

3. The connector as claimed in claim 2, wherein the first charging portions of the charge terminals are received in the charge terminal receiving hole for electrically contacting a terminal of a mating connector, the first audio portions of the audio terminals are received in the audio terminal receiving hole for transmitting signals, each of the second contacting portions of the charge terminals and the audio terminals having an elastic end, the elastic ends of the second charging portions and the second audio portions extending opposite the mating surface of the dielectric housing and extending toward the joint surface of the dielectric housing for electrically contacting a circuit board of a mobile phone.

4. The connector as claimed in claim 3, wherein the charge assembly block and the audio assembly block are melt by a ultrasonic process or a heating process so as to be securely attached to the indentations of the dielectric housing so that the charge terminal receiving hole and audio terminal receiving hole are reliably waterproofed.

5. The connector as claimed in claim 1, wherein the second contacting portions of the conductive terminals upwardly extend above the joint surface of the dielectric housing and each has a curved contacting end.

6. The connector as claimed in claim 1, wherein a groove is defined around the mating portion of the dielectric housing for receiving a waterproof gasket.

7. The connector as claimed in claim 1, wherein a pair of the alignment holes extends through the mating surface of the dielectric housing and is adjacent to a pair of lateral ends of the mating surface.

* * * * *